Figure 1:
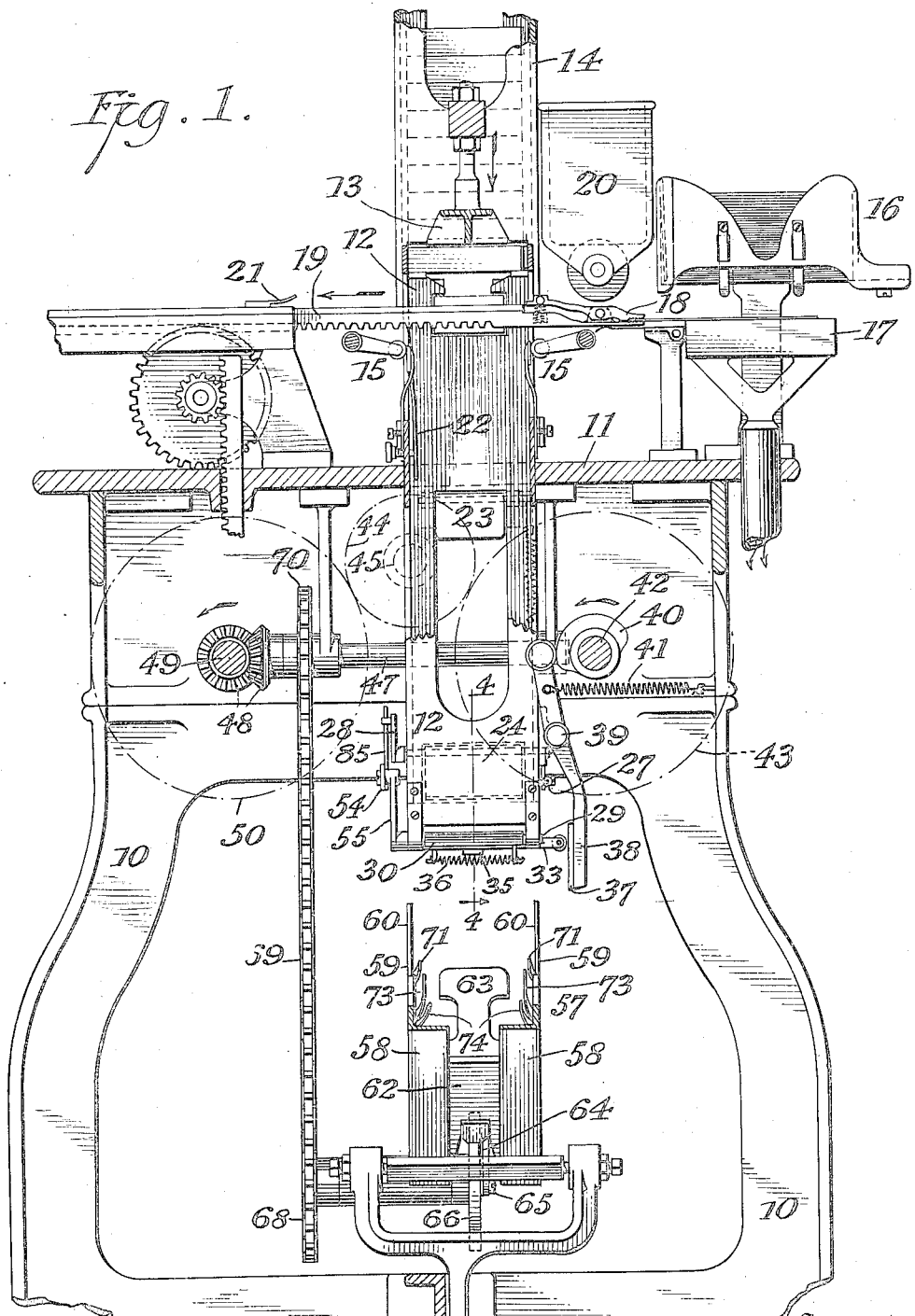

J. ALEMANY.
DELIVERY MECHANISM FOR LABELING MACHINES.
APPLICATION FILED JUNE 22, 1914.

1,108,876.

Patented Sept. 1, 1914.

4 SHEETS—SHEET 1.

Witnesses:
W. H. Hawkins
A. R. Appleman

Inventor
Joaquin Alemany
By his Attorneys
Meyers, Cushman & Rea

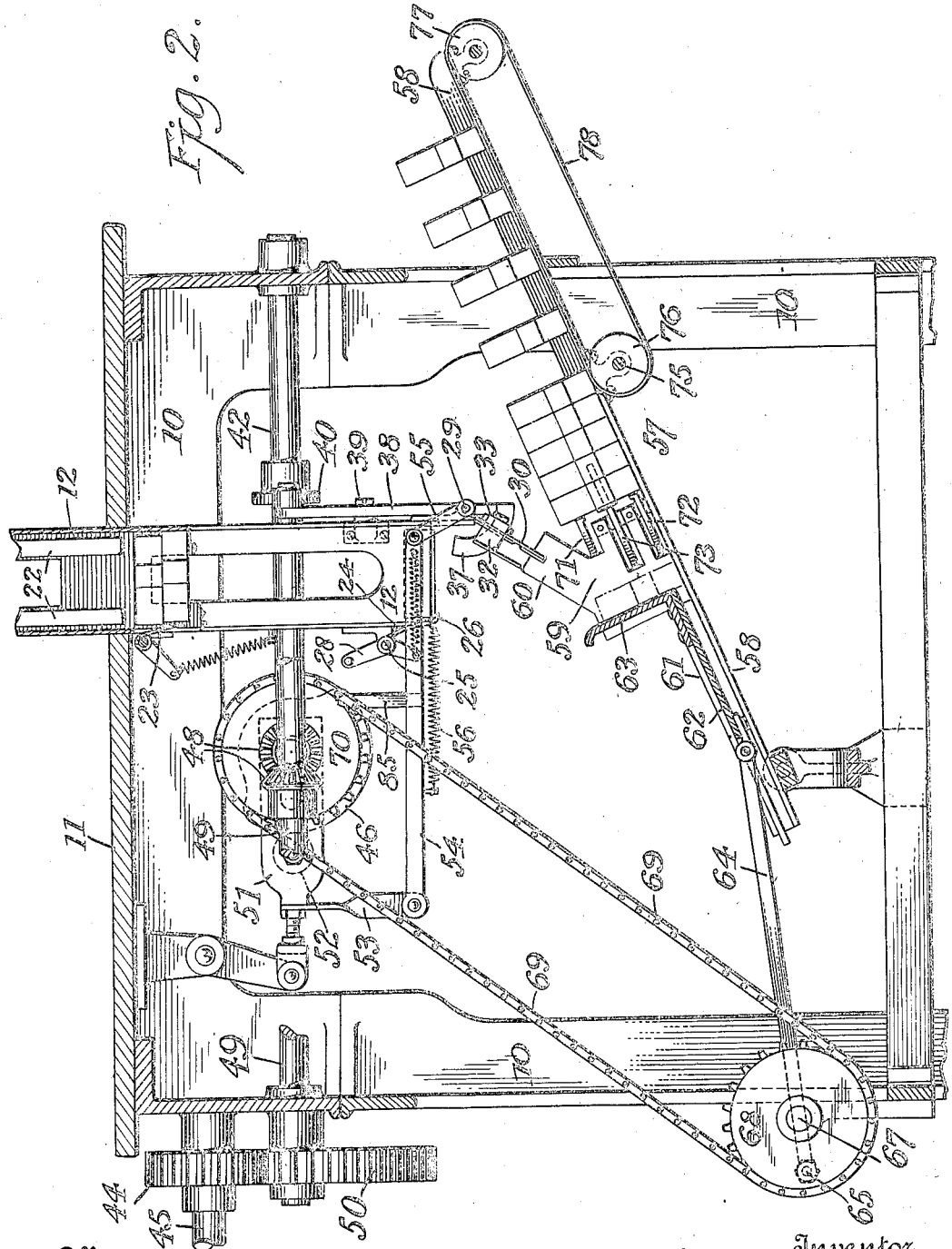

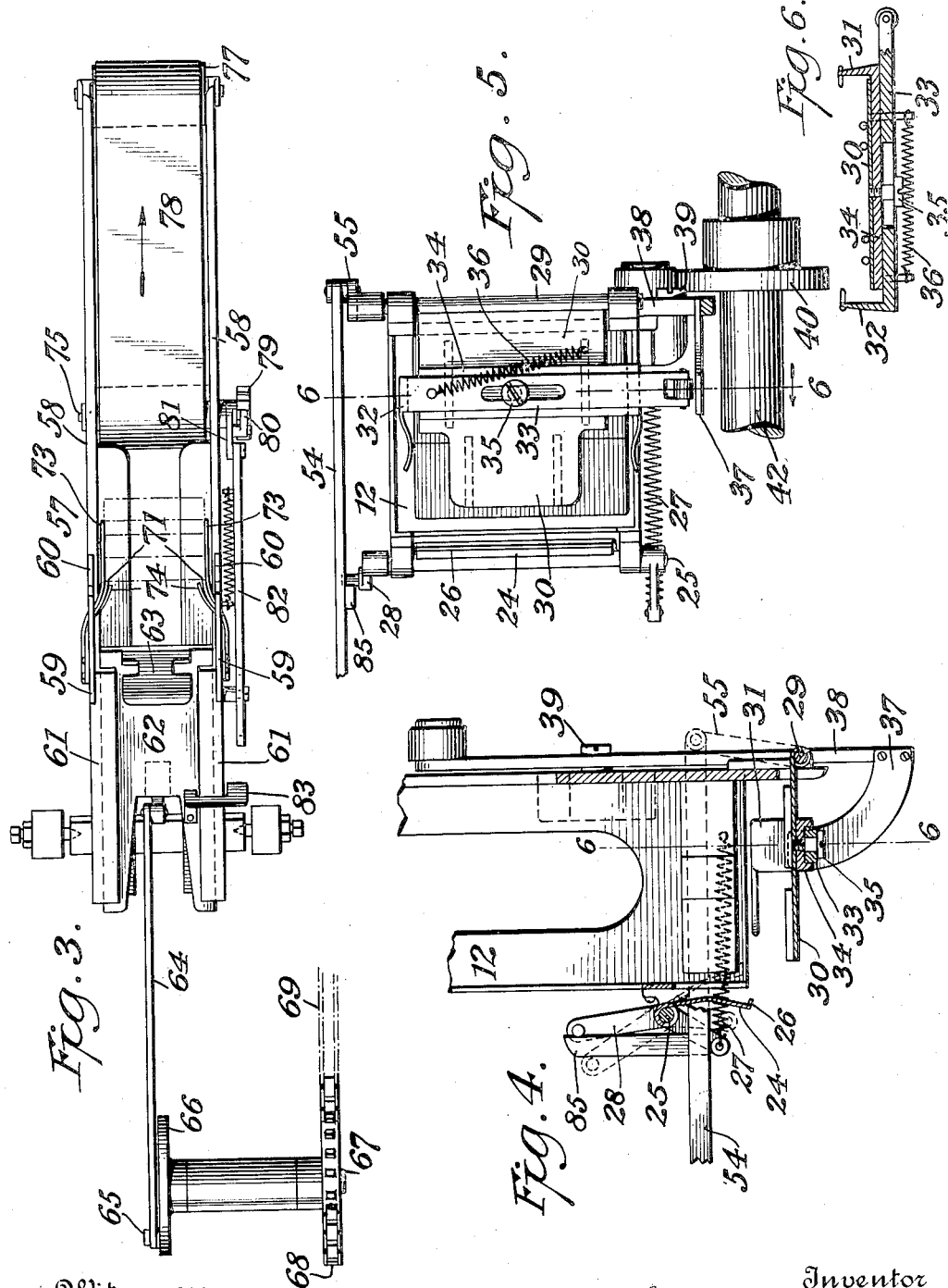

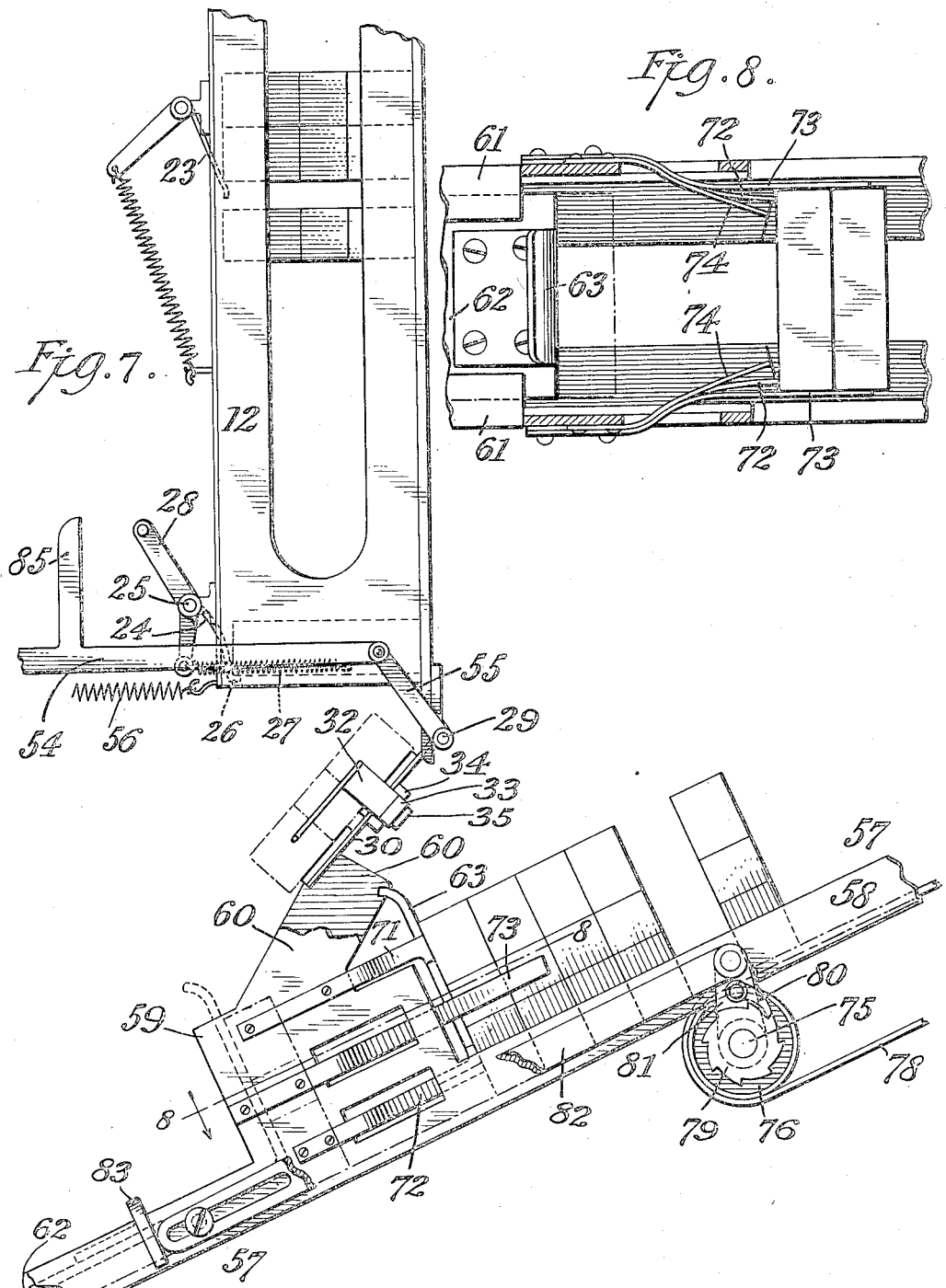

UNITED STATES PATENT OFFICE.

JOAQUIN ALEMANY, OF HABANA, CUBA, ASSIGNOR TO HAVANA COMMERCIAL COMPANY, OF HABANA, CUBA, A CORPORATION OF NEW JERSEY.

DELIVERY MECHANISM FOR LABELING-MACHINES.

1,108,876.

Specification of Letters Patent. Patented Sept. 1, 1914.

Application filed June 22, 1914. Serial No. 846,536.

*To all whom it may concern:*

Be it known that I, JOAQUIN ALEMANY, a citizen of Cuba, residing at Habana, Cuba, have invented new and useful Improvements in Delivery Mechanism for Labeling-Machines, of which the following is a specification.

This invention relates generally to machines for applying revenue stamps and other forms of labels on packages, but more particularly to the package delivery mechanism for such machines, and has for its principal object to provide in an automatic delivery mechanism, a vertical channel through which the labeled packages pass, said channel containing means for retarding the movement of the packages and causing them to collect therein in two spaced groups, said packages passing singly from the bottom of the upper group as each newly labeled package is added to the top thereof, to the lower group and from the latter group said packages are removed one at a time from the bottom thereof and carried to an intermittently moving conveyer which transports them from the machine to a suitable point for collecting and packing, said packages being given a quarter turn during their passage from the channel to the conveyer to change them from a flatwise to an endwise position.

A further object of the invention is directed to a simple means in the form of feelers that contact with the sides of each package and the ends of each label thereon as it travels along the conveyer and in case of failure of the proper devices to seal the ends of the label to the package, engage such ends and hold them in position adjacent the package that the next advancing package contacting therewith to move it forward will press said ends against the package sides and cause them to adhere thereto.

With these and other objects in view the invention consists of the novel construction, combination and arrangement of parts hereinafter described and pointed out in the appended claims, reference being had to the accompanying drawings in which—

Figure 1 is a vertical sectional view of a portion of a stamp or label applying machine provided with the improved delivery mechanism. Fig. 2 is a similar sectional view through the machine and the delivery mechanism taken at right angles to Fig. 1. Fig. 3 is a top plan view of the intermittently movable package conveyer. Fig. 4 is an enlarged sectional view of the lower end of the package channel on the line 4—4 Fig. 1. Fig. 5 is a bottom plan view of the package channel enlarged. Fig. 6 is a cross sectional view on the line 6—6 Fig. 5. Fig. 7 is an elevation of the lower end of the package channel and the adjacent portion of the conveyer. Fig. 8 is a sectional view through the conveyer on the line 8—8, Fig. 7.

In the drawings 10 indicates the supporting frame of a machine for applying revenue stamps or labels to packages, said frame supporting a flat horizontal table 11 having an opening therethrough. Extending through said opening and supported therein is a vertically disposed channel 12 into which packages to be labeled or stamped are fed by a vertically reciprocating plunger 13 operated in any suitable manner. Adjacent the upper end of the channel 12 and extending vertically an indefinite distance is a chute 14 within which packages to be stamped are placed, said packages descending the chute by gravity. The lowermost package in the chute is pushed laterally therefrom by any suitable means over the mouth of the channel into position below the plunger 13 and is moved by said plunger into the upper end of the channel 12 past the stamp or label applying devices 15, which fold the label around the package.

Below the magazine 16 for labels is a vertically movable suction head 17 that withdraws the labels one at a time from the bottom of the magazine and carries them into position to be grasped by a jaw 18 on one end of a reciprocating bar 19. At the proper time the label is drawn by said jaw from the suction head 17 and carried into the channel 12 above folding devices 15, passing on its way an adhesive applying device 20 that descends and coats the label with paste or glue. After the label has been properly placed over the folding devices the tail of the jaw 18 encounters a stop 21 that opens the jaw and releases the label.

Within the channel 12 are yielding means 22 and 23, preferably spring actuated plates, which press the packages against the sides of the channel and prevent them falling therethrough by gravity. For illustration, the means 22 comprise two spring fingers or plates fixed at one end to an inner wall of the channel, their lower ends being free. The yielding means 23 is formed by a plate hinged on the outside of the channel, its lower free end projecting through an opening in said side and held against the packages by a coiled spring. The length of channel-way controlled by the yielding devices is such as to retain at all times in said channel half a dozen packages, more or less forming what is hereinafter called an upper group of packages. These packages are advanced a short distance through the channel with the introduction of each newly labeled package, the lowermost package of the group being pushed at each advance movement beyond the influence of the lower yielding device 23 and falls by gravity to the bottom of the channel where it is caught and temporarily retained by a yielding plate 24 secured to a rock shaft 25 pivoted on the outside of the channel 12 and bearing at its free end against the lowermost package. A lip 26 is preferably formed on the free end of the yielding plate 24 and projects beneath the bottom package at the bottom of the channel to prevent the packages falling therethrough. In the present instance a spring 27 fastened at one end to the channel 12 and at its other end to an arm depending from the shaft 25 holds the plate 24 with sufficient pressure against the package to prevent it and the superposed packages falling from the channel. A second arm 28 also fixed on the shaft 25 and extending upwardly is at the proper time moved by means hereinafter described, to swing the plate 24 away from the retained package and permit the release thereof. In the operation of the machine two or three packages are usually maintained at the lower end of the channel 12, and form what is herein called the lower group.

The object of separating the packages in the channel 12 into groups, while maintaining a sufficient supply in said channel ready to be withdrawn therefrom, is to divide the weight of the packages and relieve the spring plate 24 and its lip 26 of excessive pressure that would tend to interfere with the accurate and certain operation of these parts.

A rock shaft 29 pivoted in brackets at the bottom of the channel 12 has secured thereon a shelf 30 adapted at times to be brought into horizontal position below the channel 12 as in Fig. 4, but sufficiently far below the outlet thereof to support a package after it has escaped from the plate 24. Projecting upwardly from one side of the shelf 30 is a fixed finger or stop 31; a similar finger or stop 32 extends above the shelf on the opposite side and is adapted to move to and from the fixed stop for the purpose of clamping therebetween each package that descends upon the shelf. The movable stop 32 is mounted on a slide 33 movable transversely of the shelf 30 in a guide plate 34 and held in said guide by a screw 35 extending through a slot in the slide 33. A spring 36 is connected to the slide and to the shelf 30 and draws the finger 32 toward the finger 31 for the purpose of gripping the package. The fingers are separated positively at the proper time by a curved track 37 concentric with the axis of the rock shaft 29 which strikes the end of the slide 33 opposite the finger 32, or a roller thereon, and pushes said slide longitudinally to separate the fingers. One end of the curved track 37 is fastened on the lower end of a rocking lever 38 fulcrumed at 39 intermediate its ends to a bracket on the channel 12 and has a roller on its opposite end that bears against a cam 40, by the rotation of which cam said lever 38 is caused to rock and the curved track 37 moved to and from the slide 33 for operating the same. A spring 41 attached to the lever 38 holds the same in continuous contact with the cam 40. The cam 40 is mounted on a constantly rotating shaft 42 on the outer end of which is a gear wheel 43 in engagement with a gear wheel 44 on the main shaft 45.

The shelf 30 swings through an arc of about 45 degrees from the horizontal position indicated by Fig. 4 to the inclined position of Figs. 2 and 7. This movement is imparted to the shelf by a cam 46 on a shaft 47 driven through beveled gearing 48 from a shaft 49 parallel to the shaft 42 and provided on its outer end with a spur gear 50 driven by the gear wheel 44 on the main shaft 45. The cam 46 actuates a reciprocating bar 51 through a roller 52 thereon from which bar depends a finger 53 connected by a link 54 with an arm 55 fixed on the shaft 29 that carries the shelf 30. On the link 54 is a finger 85 that at suitable times strikes the arm 28 and rocks it slightly, the movement turning the shaft 25 sufficiently to withdraw the plate 24 from pressing against the bottom package and releasing the same. A spring 56 suitably applied holds the roller 52 in contact with the cam 46.

At a suitable distance below the channel 12 is a conveyer 57 upon which the packages are deposited from the shelf 30, and by means of which they are carried from the machine to any point desired. This conveyer is shown in the present instance in an inclined position extending in an upward direction as it passes out of the machine. The frame of the conveyer is made in the present instance of two angle bars 58, that are placed in parallel relation in such manner as to form two sides and a bottom for the conveyer. Immediately beneath the channel 12 the sides of the conveyer project upwardly a suitable distance in the form of cheek plates 59, from the top of each of which is an angular extension 60 in the plane of the plates between which extension the shelf 30 swings when turned to its lowermost position. Mounted on each side of the conveyer at its lower end below the cheek plates 59 and running parallel with the angle bars 58 are two guides 61 in which a slide 62 reciprocates longitudinally of the conveyer. On the upper or forward end of said slide is an upright push plate 63 standing at a right angle to the slide. Pivoted at the opposite end of the slide 62 is a connecting bar 64 the opposite end of which is attached by a crank pin 65 to a crank disk 66 carried on one end of a shaft 67, the other end of said shaft being provided with a sprocket wheel 68 driven by a chain 69 from a sprocket wheel 70 fast on the horizontal shaft 47. The continuous rotation of the shaft 67 and crank disk 66 causes the slide 62 to move longitudinally in the conveyer 57 and advance the packages delivered by the shelf 30 into the conveyer toward its upper outer end.

After a package has passed out of the channel 12 onto the shelf 30 and has been clamped by the fingers 31, 32, said shelf is swung downward between the cheek plates, the package clamped therein is then released and falls upon the bottom of the conveyer 57 against the plate 63 on the slide 62. The package has by this movement been given a quarter turn, changing from the horizontal position it held in the channel into a substantially vertical or slightly inclined upright one, resting on one of its narrow edges with the stamp or label encircling it in a horizontal direction instead of a vertical direction as before. Fastened on the outer side of each cheek plate at the top and bottom thereof are spring fingers 71 and 72 that project through openings in said cheek plates into the path of the packages as they are pushed by the slide 62 along the conveyer and are sprung outward and so held by each successively advancing package until beyond the free ends of the fingers which then return to position and lie within the side edges of the packages, serving as stops to prevent said packages moving down the conveyer. Between the fingers 71 and 72 on each side is a finger or feeler 73 also fastened on the same cheek plate but longer than the stop fingers 71, 72, that bear continuously against the labels on the sides of one or two of the passing packages and by their resiliency insure the adhesion of the labels on the edges thereof. Immediately under each finger 73 and secured by the same fastening means is a feeler or finger 74. These feelers extend through the same openings as the fingers 73, are slightly shorter than the fingers 71 and 72 and their free ends lie nearer the center line of the conveyer than said fingers, as clearly indicated in Fig. 8. These feelers 74 are of such length that after a package has been moved as far as possible by the reciprocating slide 62 they slip from the edges of and in behind said package to engage the ends of the label should the latter fail to adhere to the package and hold it in such position that the next advancing package will press upon said ends and force them against the package in front causing them to adhere thereto.

A short distance in advance of the cheek plates 59 on the under side of the conveyer is a transverse shaft 75 upon which is mounted a drum 76. A similar drum 77 is mounted at the upper extreme end of the conveyer and around said drums passes a belt 78 upon which the packages are pushed by the slide and carried to the end of the conveyer. On the shaft 75 of the belt drum 76 is a ratchet wheel 79 with which a pawl 80 engages, said pawl being pivoted on an arm 81 rocking on the shaft 75 and operated by a rod 82 that extends down one side of the conveyer beyond the cheek plate 59 and is guided thereon in any suitable manner. A finger 83 fastened on the slide 62 will, at each upward movement of said slide, strike the lower end of the rod 82 and rock the arm 81 with its pawl 80, imparting sufficient rotation to the drum 76 through the ratchet and pawl to intermittently advance the packages on the belt toward the end of the conveyer a distance not less than the thickness of a package.

In the operation of the machine, at each reciprocation of the plunger 13 a package is pushed down the channel 12 upon an adhesively coated stamp or label, carrying the label past the folding devices 15 which wrap it around the package, thence to the upper group of packages supported by the yielding means 22, 23. The upper group of packages is, by this movement of the plunger forced downwardly a sufficient distance to disengage the lower package of said group from the yielding means 23 and fall upon the lower group in the bottom of the channel. The shelf 30 if in its lowered position, as in Fig. 2, will be raised to its upper horizontal position indicated in Fig. 4 to receive the lower package of the lower group of packages when the plate 24 is retracted to release the same. When the shelf is in its lower position and about to rise, the cam 40 will be in such position relative to the rocking lever 38 that the curved track 37 thereon will bear upon and press against the end of the slide 33 and separate the fingers 31, 32 a sufficient distance to permit the package that falls upon the shelf to enter readily between the fingers. The cam 46 through its rotation will, about this time, permit the spring 56 to retract the plate 51 and through the link 54 and connections, lift the shelf 30. At the same time the finger 85 on said link strikes the arm 28 and rocks the shaft 25 to release the pressure of the plate 24 from the lowermost package of the lower group which immediately falls upon the shelf 30. The cam 40 now operates the rocking lever 38 in a manner to withdraw the curved track 37 from contact with the slide 33 which being thus released will, under the influence of the spring 36, move the finger 32 against the package and clamp the same against the finger 31. About this time the cam 46 has turned sufficiently to positively actuate the bar 51, moving it against the action of the spring 56. The link 54 is by this movement caused to rock the shaft 29 and swing the shelf 30 to its downward position. The finger 85 on said link is also withdrawn from contact with the arm 28, permitting the plate 24 to be immediately drawn by the spring 27 against the package next following in the channel 12 and prevent it escaping. After the shelf 30 has been lowered as described between the extensions of the cheek plates 59, the cam 40 is again in position to disengage the lever 38, whereupon its spring 41, rocking said lever, the curved track 37 thereon engages with and positively moves the slide 33 to separate the fingers 31, 32, and unclamp the package which immediately slides off the shelf and into the conveyer 57 between the cheek plates and against the plate 63 on the slide 62, said package in this position resting on one of its narrow edges with the stamp or label passing around the same in a horizontal direction and in line with the feelers 73, 74. The lever 38 remains in the position just described until after the shelf has been raised, the end of the slide riding over the track 27 which is curved concentrically with the axis of said shelf as heretofore stated.

The forward movement of the slide 62 now pushes the package a sufficient distance to pass the fingers 71, 72 and feelers 74 and then retreats, releasing the package which however is prevented from returning by said fingers. The feelers 73, however, press against the stamp or label on the narrow sides of the package and hold it close thereto while the feelers 74 spring inward in position to hold the ends of the labels close to the package should they be loose or not adhering thereto. The next package, following the same course, pushes the previously wrapped package ahead of it, and so on until the most advanced package is pushed upon the belt 78 which is given an intermittent movement at the same time the packages are moved, picks up each package in succession and carries them step-by-step to the upper end of the belt.

What I claim is:—

1. A package delivering mechanism comprising a vertical channel through which packages descend, label applying means for the packages operable within said channel, separate means within said channel for temporarily retaining said packages in two separated groups, means for feeding packages singly into said channel above the upper group and pushing said upper group downwardly until the lowermost package thereof passes the retaining means to fall upon the lower group, and means for positively operating the lower retaining means to release the lowermost package of the lower group.

2. A package delivering mechanism comprising a vertical channel through which packages descend, label applying means for the packages operable within said channel, yielding means within said channel for temporarily retaining a group of packages above the outlet end of said channel, a second yielding means at the outlet end of the channel for temporarily retaining a second group of packages in the channel spaced from the upper group, means for feeding packages one at a time to said upper group and for pushing said upper group of packages down the channel until the lowermost package passes the retaining means to fall upon the lower group, and means for positively operating the lower retaining means to release the lowermost package of the lower group.

3. A package delivering mechanism comprising a vertical channel through which packages descend, label applying means for the packages operable within said channel, separate yielding means within said channel for temporarily retaining said packages in two spaced groups, means for intermittently feeding packages upon the top of the upper group of packages and moving said group bodily through its retaining means until the lowermost package of said group passes said retaining means and falls upon the lower group of packages, and means for positively actuating the retaining means for the lower group of packages to release singly the lowermost package of said group.

4. A package delivering mechanism comprising a vertical channel through which packages descend, label applying means for the packages operable within the said channel, means for temporarily retaining separated groups of packages within said channel, means for feeding packages singly to the upper group of packages and advancing said group along said channel until the lowermost package of the group escapes the retaining means and falls upon the lower group of packages, means for positively operating the retaining means of the lower group of packages to release the bottom package thereof, a conveyer for transporting packages from the machine, and a movable support to receive said positively released package and deliver the same to said conveyer.

5. A package delivering mechanism comprising a vertical channel through which packages descend, label applying means for the packages operable within said channel, means for temporarily retaining separated groups of packages within said channel, means for feeding packages singly to the upper group of packages and advancing said group along said channel until the lowermost package of the group escapes the retaining means and falls upon the lower group of packages, means for positively actuating the retaining means for the lower group of packages to release the bottom package thereof, a conveyer for transporting packages from the machine, a movable support to receive said positively released package, turn the same and transfer it to said conveyer, and a clamping means on said support to hold said package while being turned and transferred.

6. A package delivering mechanism comprising a vertical channel through which packages descend, label applying means for the packages operable within said channel, means within said channel for temporarily retaining said packages in two separated groups, independent means for releasing the lowermost package of each group, a conveyer for transporting the package from the machine, and a swinging support at the outlet end of the channel to receive the lowermost package of the lower group when released and transfer the same to said conveyer.

7. A package delivering mechanism comprising a vertical channel through which packages descend, label applying means for the packages operable within said channel, means within said channel for temporarily retaining said packages in two separated groups, separate means for releasing the lowermost package of each group, a conveyer for transporting packages from the machine, a swinging support at the outlet end of the channel to receive the lowermost package of the lower group and deliver the same to said conveyer, a clamp carried by said swinging support for holding the package thereon from displacement, and positively operating means to actuate said clamp and release said package when said support is in position above said conveyer.

8. A package delivering mechanism comprising a vertical channel through which packages descend, label applying means for the packages operable within said channel, means also within said channel for retaining said packages in two separated groups, independent means for releasing the lowermost package of each group, a swinging support at the outlet end of the channel to receive the lowermost package of the lower group when released by its retaining means, and a common means for swinging said support to receive and deliver packages and to actuate the releasing means for the lowermost package of the lower group.

9. A package delivering mechanism comprising a vertical channel through which packages descend, label applying means for the packages operable within said channel, means at the outlet end of said channel for temporarily retaining packages therein, said means comprising a spring actuated plate bearing against the lower package, a swinging support below the outlet end of said channel to receive packages passing therethrough, and means for swinging said support toward the channel and at the same time release said retaining means from contact with the lowest package to permit the latter falling upon the support, said means by a reverse movement simultaneously lowering the swinging support and releasing the resiliently operated plate to retain the next succeeding package in the channel.

10. A package delivering mechanism comprising a vertical channel through which packages descend, label applying means for the packages operable within said channel, means at the outlet end of said channel for temporarily retaining packages therein, said means comprising a spring actuated plate bearing against the lower package, a swinging support below the outlet end of said channel to receive packages therethrough, means for swinging said support toward the channel and at the same time release said retaining means from contact with the lowest package to permit the latter falling upon the support, said means by a reverse movement simultaneously lowering the swinging support and releasing the resiliently operated plate to retain the next succeeding package in the channel, a clamp on said swinging support for holding packages thereon during the downward movement of said support, and positively actuated means for disengaging said clamp at the completion of said downward movement.

11. A package delivering mechanism comprising a vertical channel through which packages descend, label applying means for the packages operable within said channel, means at the outlet end of said channel for temporarily retaining packages therein, a swinging support at the outlet end of said channel to receive packages after passing through the channel and released from the retaining means, a conveyer below said swinging support upon which packages are delivered from the swinging support, a reciprocating slide on said conveyer for advancing packages along the same, and an intermittently driven belt forming a part of said conveyer upon which packages are pushed by said slide.

12. A package delivering mechanism comprising a vertical channel through which packages descend, label applying means for the packages operable within said channel, means at the outlet end of said channel for temporarily retaining packages therein, a swinging support at the outlet end of the channel to receive labeled packages when released by the retaining means, a conveyer below said channel upon which packages are delivered by the swinging support, a reciprocating slide on said conveyer to advance packages along the same, and resilient means carried by said conveyer adapted to bear on the label of such package and spring behind said package to fold in and retain folded the ends of said label should the label applying means fail to seal them, that the next succeeding package may press them in place and cause them to adhere.

13. A package delivering mechanism comprising a vertical channel through which packages descend, label applying means for the packages operable within said channel, a conveyer below said channel for transporting label packages from the machine, a swinging support at the outlet end of said channel for delivering packages one at a time from the channel onto the conveyer, and means on said conveyer for insuring the complete attachment of the label should the aforesaid label applying means fail to do so.

14. A package delivering mechanism comprising a vertical channel through which packages descend, label applying means for the packages operable within said channel, a conveyer below said channel for transporting labeled packages from the machine, a swinging support at the outlet end of said channel for delivering packages one at a time onto the conveyer from the channel after turning the same a quarter revolution, a clamp on said swinging support for holding the package during delivery and turning, and resilient means on said conveyer for insuring the complete attachment of the label should the aforesaid label applying means fail to do so.

15. A package delivery mechanism comprising a vertical channel through which packages descend, label applying means for the packages operable within said channel, a conveyer below said channel for transporting labeled packages from the machine, a swinging support at the outlet end of said channel for delivering packages one at a time onto the conveyer from the channel after turning the same a quarter revolution, and spring fingers on said conveyer for insuring the complete attachment of the label should the aforesaid label applying means fail to do so.

16. A package delivering mechanism comprising a vertical channel through which packages descend, label applying means for the packages operable within said channel, a conveyer below said channel for transporting said packages from the machine, a swinging support at the outlet end of said channel for delivering packages one at a time onto the conveyer from the channel after turning the same a quarter revolution, and a clamp on said swinging support for holding the package during delivery and turning.

17. A package delivering mechanism comprising a vertical channel through which packages descend, label applying means for the packages operable within said channel, means at the outlet end of said channel for temporarily retaining packages therein, a conveyer below said channel for transporting packages from the machine, a swinging support at the outlet end of the channel for delivering packages one at a time onto the conveyer from the channel, and operating means common to said retaining means and to the swinging support for releasing a single package and actuating said support to deliver the released package.

18. A package delivering mechanism comprising a vertical channel through which packages descend, label applying means for the packages operable within said channel, means at the outlet end of said channel for temporarily retaining packages therein, a conveyer below said channel for transporting packages from the machine, a swinging support at the outlet end of the channel for delivering packages one at a time onto the conveyer from the channel, a clamp on said swinging support to hold the package during delivery, operating means common to said retaining means and to the swinging support for releasing a single package and actuating said support to deliver the released package, and means for operating the package clamp.

In testimony whereof I have hereunto set my hand in presence of two subscribing witnesses.

JOAQUIN ALEMANY,

Witnesses:
MIGUEL MONTEJO,
RAOUL F. WASHINGTON.